G. E. CRAWFORD.
SPRING WHEEL.
APPLICATION FILED AUG. 20, 1913.
1,095,821.
Patented May 5, 1914.
2 SHEETS—SHEET 1.
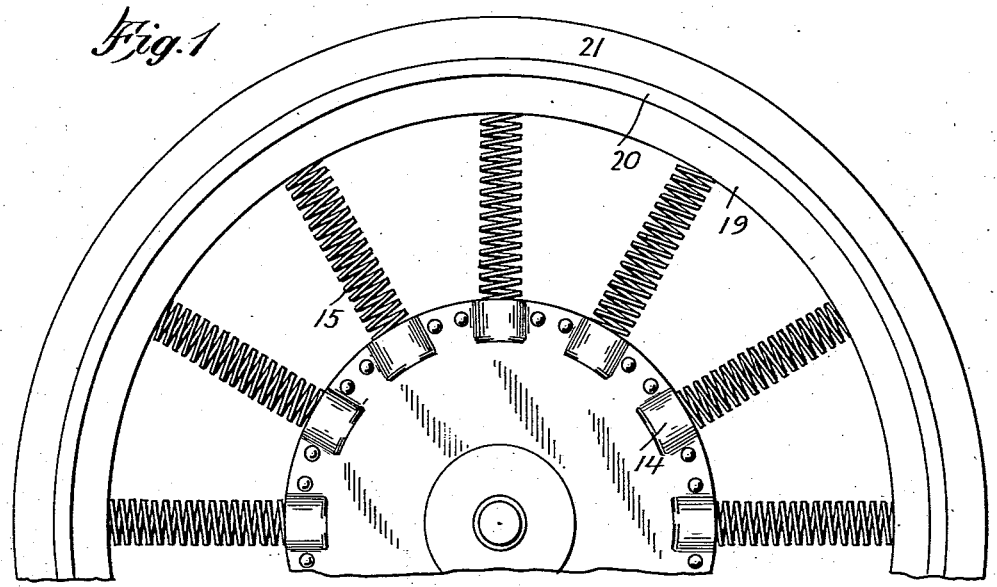
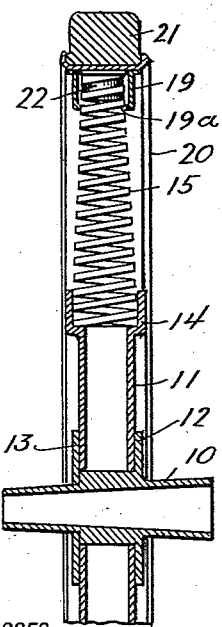
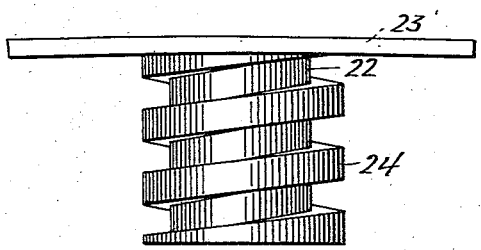
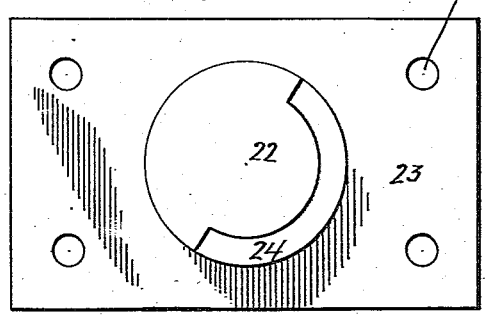
WITNESSES
INVENTOR
GEORGE E. CRAWFORD
BY
ATTORNEYS

G. E. CRAWFORD.
SPRING WHEEL.
APPLICATION FILED AUG. 20, 1913.

1,095,821.

Patented May 5, 1914.
2 SHEETS—SHEET 2.

WITNESSES

INVENTOR
GEORGE E. CRAWFORD
BY
ATTORNEYS

UNITED STATES PATENT OFFICE.

GEORGE EMERSON CRAWFORD, OF BRITTON, OKLAHOMA.

SPRING-WHEEL.

1,095,821.  Specification of Letters Patent.  Patented May 5, 1914.

Application filed August 20, 1913. Serial No. 785,636.

*To all whom it may concern:*

Be it known that I, GEORGE E. CRAWFORD, a citizen of the United States, and a resident of Britton, in the county of Oklahoma and State of Oklahoma, have invented a new and Improved Spring-Wheel, of which the following is a full, clear, and exact description.

The invention relates to spring wheels, particularly automobile wheels, and it is the design of the invention to provide a wheel of the indicated character which will present an attractive appearance and afford the necessary resiliency although involving a minimum cost of manufacture and up-keep.

The invention will be particularly explained in the specific description following.

Reference is to be had to the accompanying drawings forming a part of this invention, in which similar characters of reference indicate corresponding parts in all the views, and in which—

Figure 5:
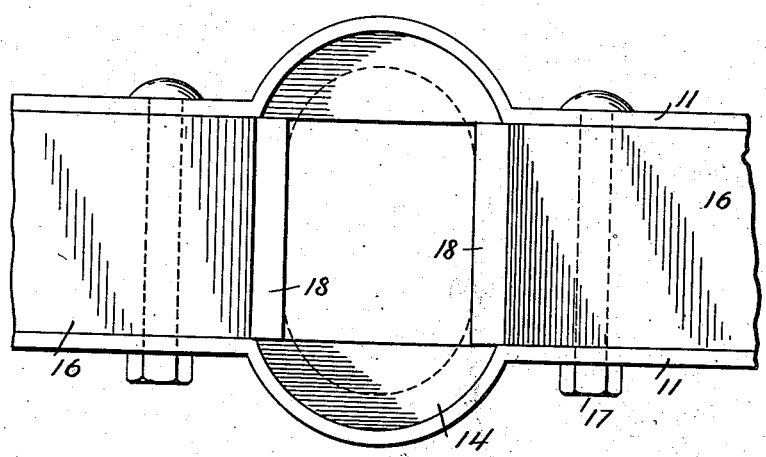
Figure 6:
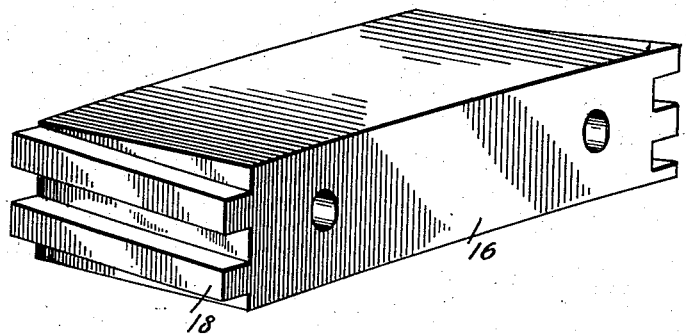

Figure 1 is a partial side view of a wheel embodying my invention; Fig. 2 is a transverse vertical section; Fig. 3 is a side elevation of one of the threaded studs and its attaching plate for securing the outer ends of radial compression springs employed in the wheel; Fig. 4 is an inner face view of the device shown in Fig. 3; Fig. 5 is a detail front view of a portion of the hub section or rigid center of the wheel, showing one of the seats for the inner end of the compression springs; and Fig. 6 is a perspective view of one of the spacing blocks employed between the side plates of the hub section.

In forming a wheel in accordance with my invention, a hub 10 of any suitable form is employed, associated with which are side plates 11 secured to the hub flanges 12—13. At the outer edges of the side plates 11 said plates are formed with elliptical seats 14 which receive the inner ends of radially disposed spiral compression springs 15, the said springs being flattened at opposite sides of the inner end or made elliptical, the major axis of the elliptical end of each spring and of its seat 14 being disposed transversely of the wheel with a view to receive end thrusts at the hub section of the wheel. Between the side plates 11 is an annular series of spacing blocks 16 which alternate with the seats 14 and are formed at their opposed ends with ribs 18 disposed approximately as a section of the screw thread, said ribs receiving the convolutions of the springs 15 at the inner ends. The spacing blocks are clamped between the side plates by means of bolts 17 or equivalent means. Around the outer ends of the springs 15 is a false felly 19 formed of sheet metal and of U-shape in cross section, the closed end of the felly being disposed inwardly and formed with holes 19ª through which the outer ends of the springs 15 extend to the interior of the felly. The element 19 may be secured by any suitable securing means. A rim 20 is secured to the felly and receives a solid resilient tire 21. The rim 20 carries an endless series of threaded studs 22 which are formed on securing plates 23, said plates being suitably secured to the inner side of the rim, the threads of the studs receiving the convolutions at the outer ends of the compression springs. I have shown in the drawing, holes 23ª in the plate 23 to receive bolts, screws, or other common expedients.

By the described construction, a wheel having efficient resiliency is provided and the parts are few and of simple form so that the said parts may be produced and assembled at a minimum cost.

Having thus described my invention, what I claim as new and desire to secure by Letters Patent is:—

A spring wheel comprising a hub, side plates carried by the hub and formed with elliptical seats at the periphery, spacing blocks between the plates and alternating with the seats, the opposed ends of adjacent blocks having ribs approximately sections of a screw thread, radially disposed spiral springs having elliptical ends accommodated in the seats and engaging the ribs of the spacing blocks, and a rim outside the springs, the rim being provided with an annular series of studs projecting radially inward and engaging the convolutions of the springs at the outer ends.

In testimony whereof I have signed my name to this specification in the presence of two subscribing witnesses.

GEORGE EMERSON CRAWFORD.

Witnesses:
 D. L. SELLERS,
 A. W. HEDGE.